(12) United States Patent
Geiger (10) Patent No.: US 7,237,957 B2
(45) Date of Patent: Jul. 3, 2007

(54) JOURNAL BEARING HAVING SELF-RETAINING SHOES AND METHOD OF USING THE SAME TO SUPPORT A ROTATING SHAFT

(75) Inventor: Harry Geiger, Warrington, PA (US)

(73) Assignee: Kingsbury, Inc., Philadelphia, PA (US)

( * ) Notice: Subject to any disclaimer, the term of this patent is extended or adjusted under 35 U.S.C. 154(b) by 179 days.

(21) Appl. No.: 11/069,876

(22) Filed: Feb. 28, 2005

(65) Prior Publication Data

US 2006/0193543 A1    Aug. 31, 2006

(51) Int. Cl.
*F16C 17/03* (2006.01)
(52) U.S. Cl. ................................ 384/312; 384/309
(58) Field of Classification Search ........ 384/303–312, 384/117
See application file for complete search history.

(56) References Cited

U.S. PATENT DOCUMENTS

| | | | |
|---|---|---|---|
| 3,454,312 A * | 7/1969 | Bielec | 384/307 |
| 3,994,541 A | 11/1976 | Geary et al. | |
| 4,254,961 A * | 3/1981 | Fersht et al. | 277/410 |
| 4,568,204 A * | 2/1986 | Chambers | 384/152 |
| 4,909,639 A | 3/1990 | Belanger | |
| 5,054,938 A | 10/1991 | Ide | |
| 5,403,154 A | 4/1995 | Ide | |
| 5,660,481 A | 8/1997 | Ide | |
| 5,743,657 A | 4/1998 | O'Reilley et al. | |
| 5,759,011 A | 6/1998 | Moll | |
| 5,795,076 A * | 8/1998 | Ball et al. | 384/307 |
| 5,971,616 A * | 10/1999 | New | 384/122 |
| 6,089,754 A | 7/2000 | Wilkes et al. | |
| 6,361,215 B1 | 3/2002 | Wilkes et al. | |
| 6,471,404 B1 | 10/2002 | Gozdawa | |
| 2003/0021503 A1 * | 1/2003 | Branagan | 384/303 |

* cited by examiner

*Primary Examiner*—Thomas R. Hannon
(74) *Attorney, Agent, or Firm*—Brian L. Belles; Amy M. Fernandez; Wolf Block Schorr & Solis-Cohen (57) ABSTRACT

A journal bearing, and a method of using the same, that utilizes self-retaining bearing shoes that prohibit relative movement between an aligning ring and the bearing shoes in the axial direction. In one aspect, the invention comprises an aligning ring; at least one shoe having a rear surface and a working surface for bearing contact with the rotating shaft, the at least one shoe having a flange extending from the rear surface; and the at least one shoe positioned in the aligning ring so that surface contact between the flange and the aligning ring prohibits the at least one shoe from separating from the aligning ring in an axial direction.

19 Claims, 12 Drawing Sheets

JOURNAL BEARING HAVING SELF-RETAINING SHOES AND METHOD OF USING THE SAME TO SUPPORT A ROTATING SHAFT

FIELD OF THE INVENTION

The present invention relates generally to the field of journal bearings, and specifically to hydrodynamic tilting-pad journal bearings.

BACKGROUND OF THE INVENTION

Conventional tilting-pad journal bearings are provided with an aligning ring on which is mounted a series of bearing shoes that are positioned so as to face the surface of a rotating shaft. Lubrication is provided to the bearing by feeding oil into passageways in the aligning ring that lead to a location between the shoes, or by flooding the inside of the aligning ring and the shoes with oil. The aligning ring surrounds the bearing shoes, therefore preventing the working surface of the bearing shoes from disengaging the rotating shaft by moving in the radial direction. The bearing shoes are prevented from disengaging the aligning ring in an axial direction of the shaft by retaining plates that are secured to the top and bottom of the aligning ring. These retaining plates trap the bearing shoes within the aligning ring, thereby prohibiting relative movement between the bearing shoes and the aligning ring in the axial direction of the shaft during use. As a result, the bearing shoes can not disengage the aligning ring by sliding in the axial direction along the shaft. In other prior art journal bearings, the bearing shoes are properly secured in the aligning ring through the use of screws, bolts, or the like.

Figure 1:
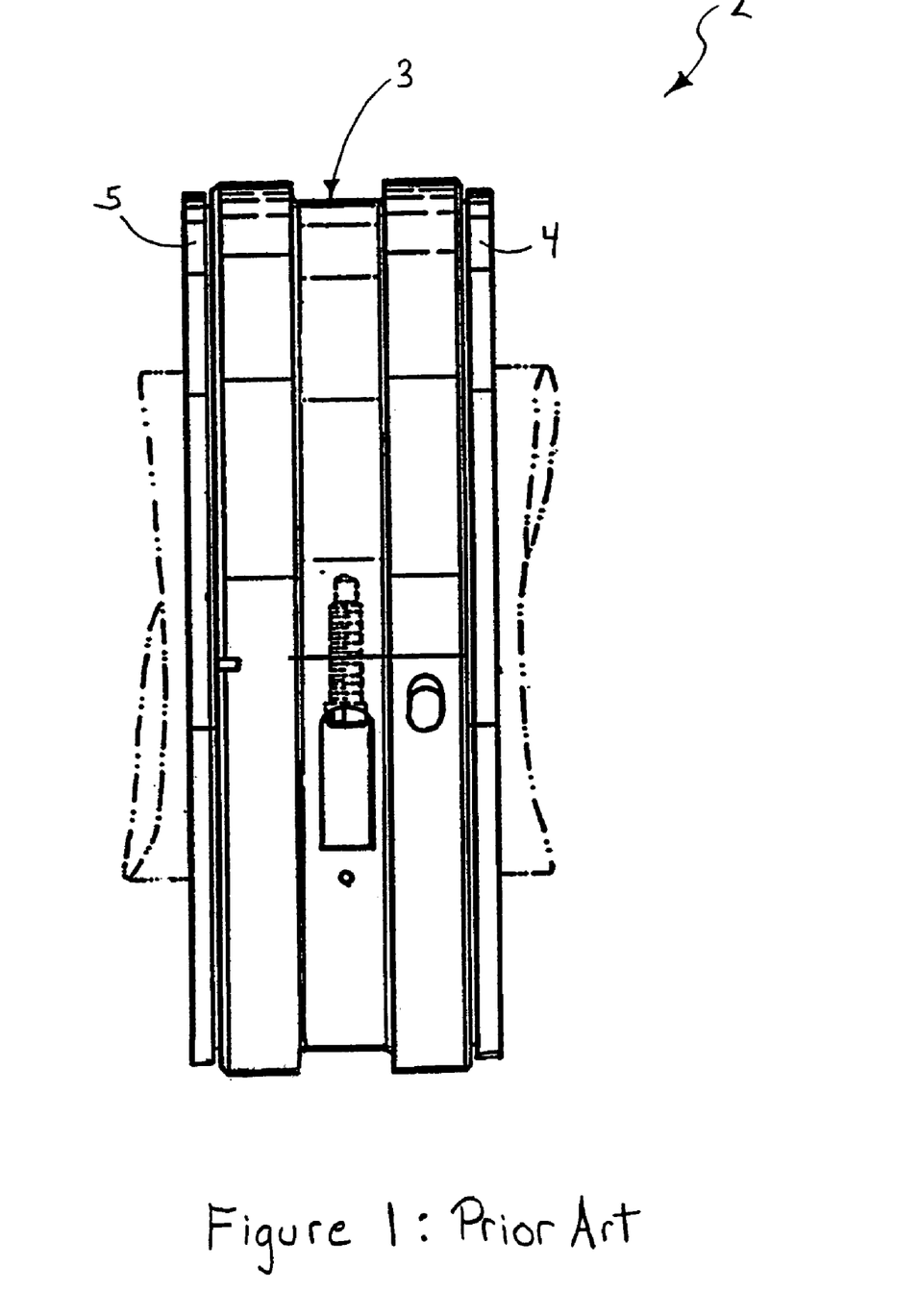
FIG. 1 is side view of a prior art journal bearing supporting a shaft.
Figure 2:
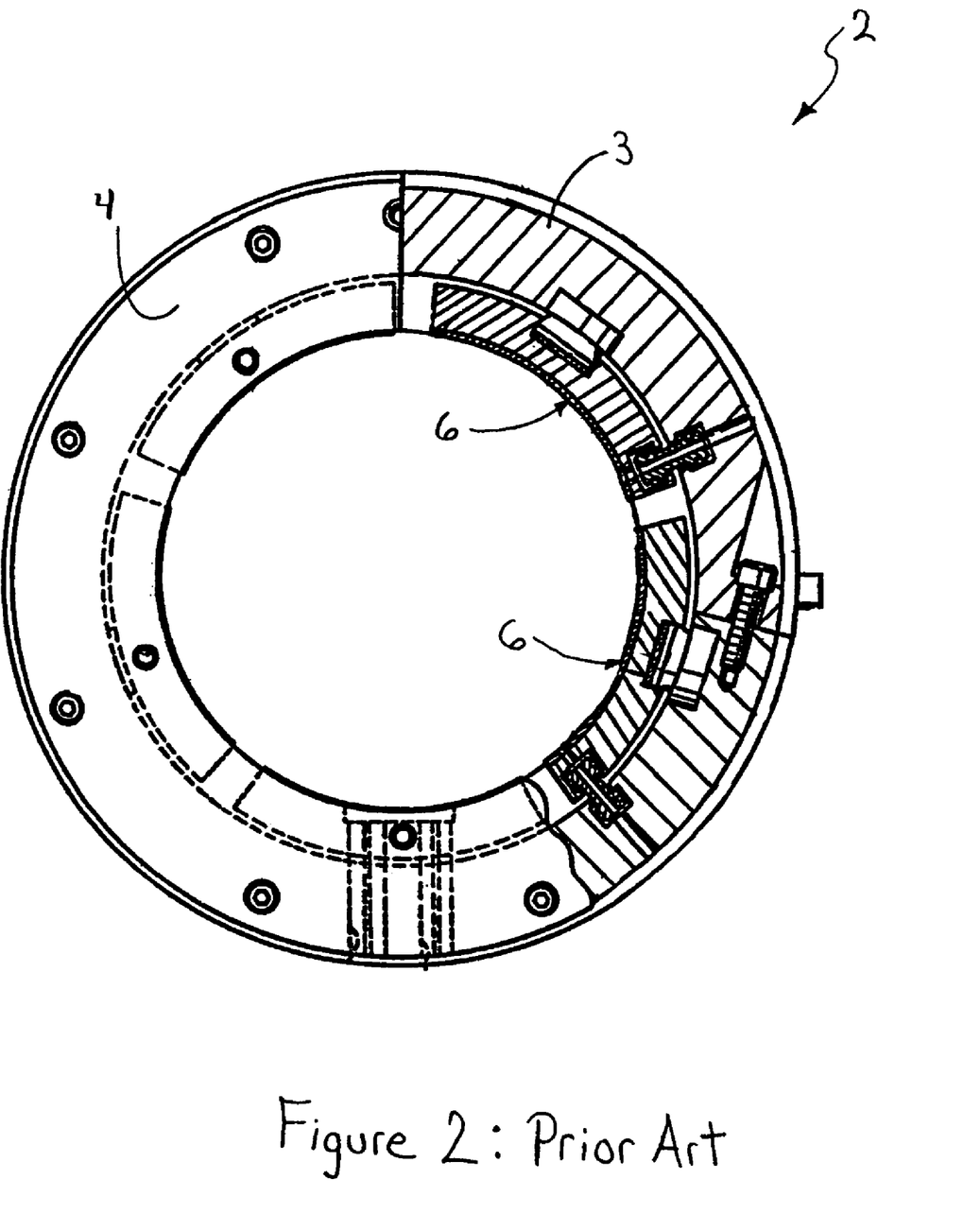
FIG. 2 is top view of the prior art journal bearing of FIG. 1 in partial cross-section.

FIGS. 1 and 2 illustrate a prior art journal bearing 2 that utilizes retaining plates to restrict axial movement of the bearing pads. The prior art journal bearing 2 comprises an aligning ring 3, retaining plates 4–5, and a plurality of bearing shoes 6. The bearing shoes 6 are positioned within the aligning ring 3 and are sandwiched between the retaining plates 4–5. Details of such a prior art journal bearing are set forth in U.S. Pat. No. 4,568,204, Chambers, the teachings of which are incorporated herein by reference in its entirety.

While such prior art journal bearings perform their supporting function adequately, the use of retaining plates increases the number of components used to form the journal bearing. This results in an increase in manufacturing costs, greater potential for failure between parts, and an increase in both installation difficulty and installation time.

SUMMARY OF THE INVENTION

It is therefore an object of the present invention to provide a journal bearing that is easier and/or more cost effective to manufacture.

Another object of the present invention is to provide a journal bearing having a decreased number of parts.

Yet another object of the present invention is to provide a journal bearing that is easy to install, repair, and/or remove.

Still another object of the present invention is to provide a journal bearing that does not require the use of retaining plates to restrict axial movement of the bearing shoes.

A further object of the present invention is to provide a journal bearing that is less susceptible to failure.

A still further object of the present invention is to provide a method of installing a journal bearing to support a rotating shaft that is easy and/or time efficient.

A yet further object of the present invention is to provide a journal bearing that has self-retaining bearing shoes.

These and other objects are met by the present invention, which in one aspect is a journal bearing for supporting a rotating shaft having an axis, the journal bearing comprising: an aligning ring; at least one shoe having a rear surface and a working surface for bearing contact with the rotating shaft, the at least one shoe having a flange extending from the rear surface; and the at least one shoe positioned in the aligning ring so that surface contact between the flange and the aligning ring prohibits the at least one shoe from separating from the aligning ring in an axial direction.

By providing a flange extending form the rear surface of the bearing shoe, the bearing shoe can be self-retaining. In some embodiments, the journal bearing will comprise first and second flanges extending from the rear surface of the at least one shoe. In such an embodiment, the first flange is located on a top portion of the at least one shoe and the second flange is located on a bottom portion of the at least one shoe. The at least one shoe is positioned in the aligning ring so that the first flange extends above a top surface of the aligning ring and the second flange extends below a bottom surface of the aligning ring. Preferably, a bottom surface of the first flange will contact the top surface of the aligning ring and a top surface of the second flange will contact with the bottom surface of the aligning ring. As a result, the first and second flanges of the bearing shoe restrict axial movement of the bearing shoe with respect to the aligning ring through surface contact.

In this embodiment, it is further preferable that the aligning ring have a substantially smooth inner surface. Most preferably, the first flange will extend from the rear surface at a top of the at least one shoe and the second flange will extend from the rear surface at a bottom of the at least one shoe.

In other embodiments of the invention, the aligning ring can have an inner surface that comprises a groove. In this embodiment, the shoe is positioned in the aligning ring so that the flange extends into the groove, forming a flange/grove assembly. One or more flange/groove assemblies can be used for each shoe if desired.

The journal bearing of the present invention is preferably free of retaining plates and comprises a plurality of shoes. In some embodiments, each shoe will preferably have a rear surface and a working surface for bearing contact with the rotating shaft. Each shoe in this embodiment will preferably have a flange extending from its rear surface and will be positioned in the aligning ring so that surface contact between the flange and the aligning ring prohibits each shoe from separating from the aligning ring in an axial direction.

Oil feed bars are preferably secured in the aligning ring between each of the shoes. Most preferably, the oil feed bars are secured to the aligning ring so as to prohibit relative movement between the shoes and the aligning ring in a circumferential direction. The number of shoes can be five.

It is further preferable in some embodiments that the aligning ring be a two-piece assembly. If desired, a shoe support can be supplied on the rear surface of the shoes, wherein the shoe support is in surface contact with an inner surface of the aligning ring. A shim may also be retained between the shoe support and the shoe.

In some embodiments, the flange will extend at least ⅛ inch from the rear surface of the at least one shoe. The working surface of the at least one shoe is preferably arcuate in shape for supporting a cylindrical shaped shaft.

In another aspect, the invention is a method of supporting a rotating shaft having an axis comprising: providing a journal bearing comprising an aligning ring, at least one shoe having a rear surface and a working surface for bearing contact with the rotating shaft, the at least one shoe having a flange extending from the rear surface, and the at least one shoe positioned in the aligning ring so that surface contact between the flange and the aligning ring prohibits the at least one shoe from separating from the aligning ring in an axial direction; fitting the journal bearing around a section of the shaft so that the outside surface of the shaft is in bearing contact with each of the shoes; and rotating the shaft.

In some embodiments, wherein the aligning ring is a two-piece assembly, the fitting step will preferably comprise: positioning a first piece of the aligning ring having one or more of the shoes retained therein on one side of the shaft; positioning a second piece of the aligning ring having one or more of the shoes retained therein on an opposite side of the shaft; and moving the first piece of the aligning ring toward the second piece of the aligning ring until the shaft is in bearing contact with the shoes of the first and second pieces of the aligning ring, wherein at least one of the shoes slidably receives and guides either the first or second piece of the aligning ring during said moving; and connecting the first and second pieces of the aligning ring.

Moreover, any or all of the details of the journal bearing discussed above can be incorporated into the method if desired.

In other aspects, the invention can be the bearing shoe, independent of the other components of the journal bearing.

DETAILED DESCRIPTION OF THE DRAWINGS

Figure 3:
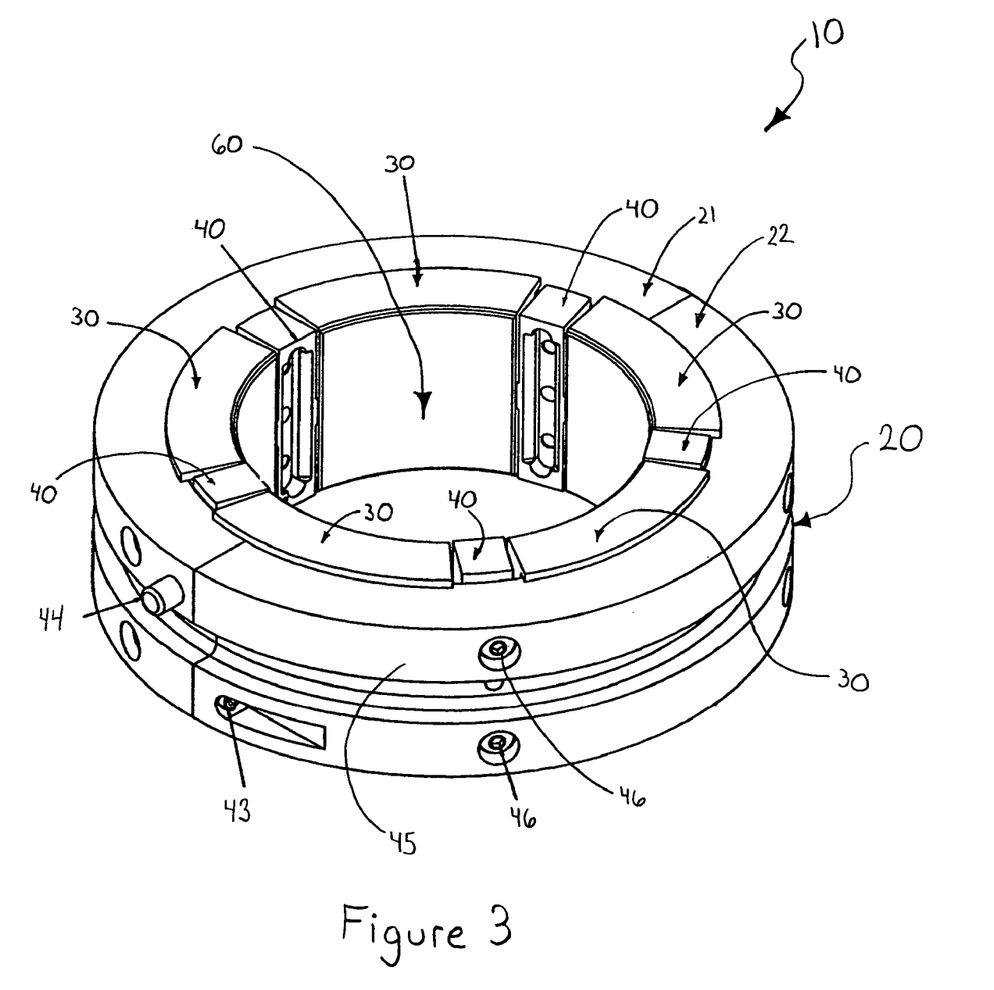
FIG. 3 is a top perspective view of a journal bearing according to a first embodiment of the present invention.

FIG. 3 illustrates a journal bearing 10 according to a first embodiment of the present invention. The journal bearing 10 comprises an aligning ring 20, a plurality of self-retaining shoes 30, and a plurality of oil feed bars 40. When the journal bearing 10 is fully assembled, as shown in FIG. 3, the plurality of bearing shoes 30 and the plurality of oil feed bars 40 are located within the aligning ring 20, forming a circular opening 60 for receiving a rotating shaft (not illustrated).

The journal bearing 10 has five bearing shoes 30 and five oil feed bars 40. The bearing shoes 30 and the oil feed bars 40 are positioned within the aligning ring 20 in a circumferential alternating pattern (i.e., an oil feed bar 40 is positioned between each bearing shoe 30).

The aligning ring 20 is a two piece assembly, comprising a first piece 21 and a second piece 22. The first and second pieces 21, 22 are secured together via two joint screws 43 to form the aligning ring 20. The aligning ring 20 further comprises an anti-rotation dowel 44 extending from the outer surface 45 of the aligning ring 20. The anti-rotation dowel 44 can be used to engage a stationary body (not illustrated) so that when the journal bearing 10 is used to support a rotating shaft, rotation of the journal bearing 10 will be prohibited. Each oil bar 40 is secured to the aligning ring 20 by two feed bar screws 46.

Figure 4:
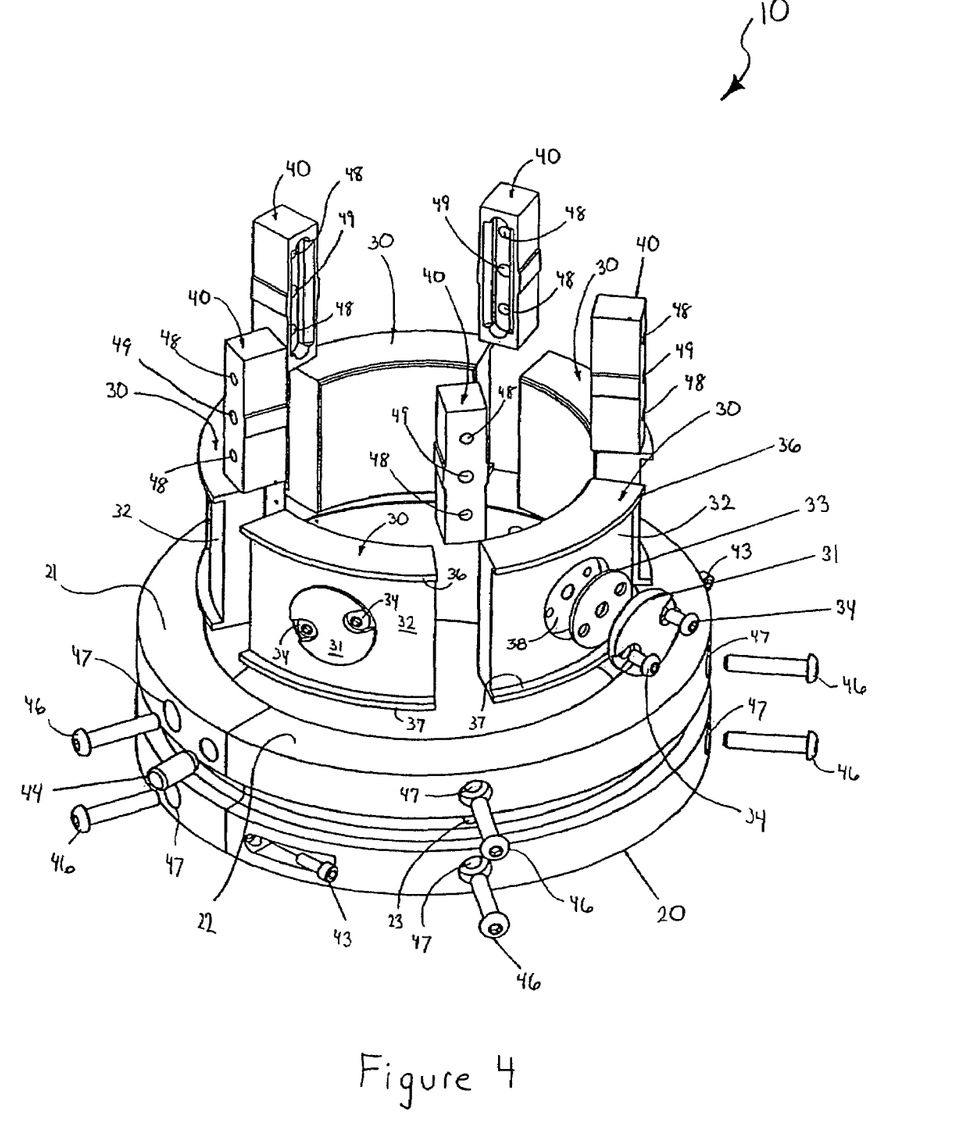
FIG. 4 is an exploded view of the journal bearing of FIG. 3.
Figure 10:
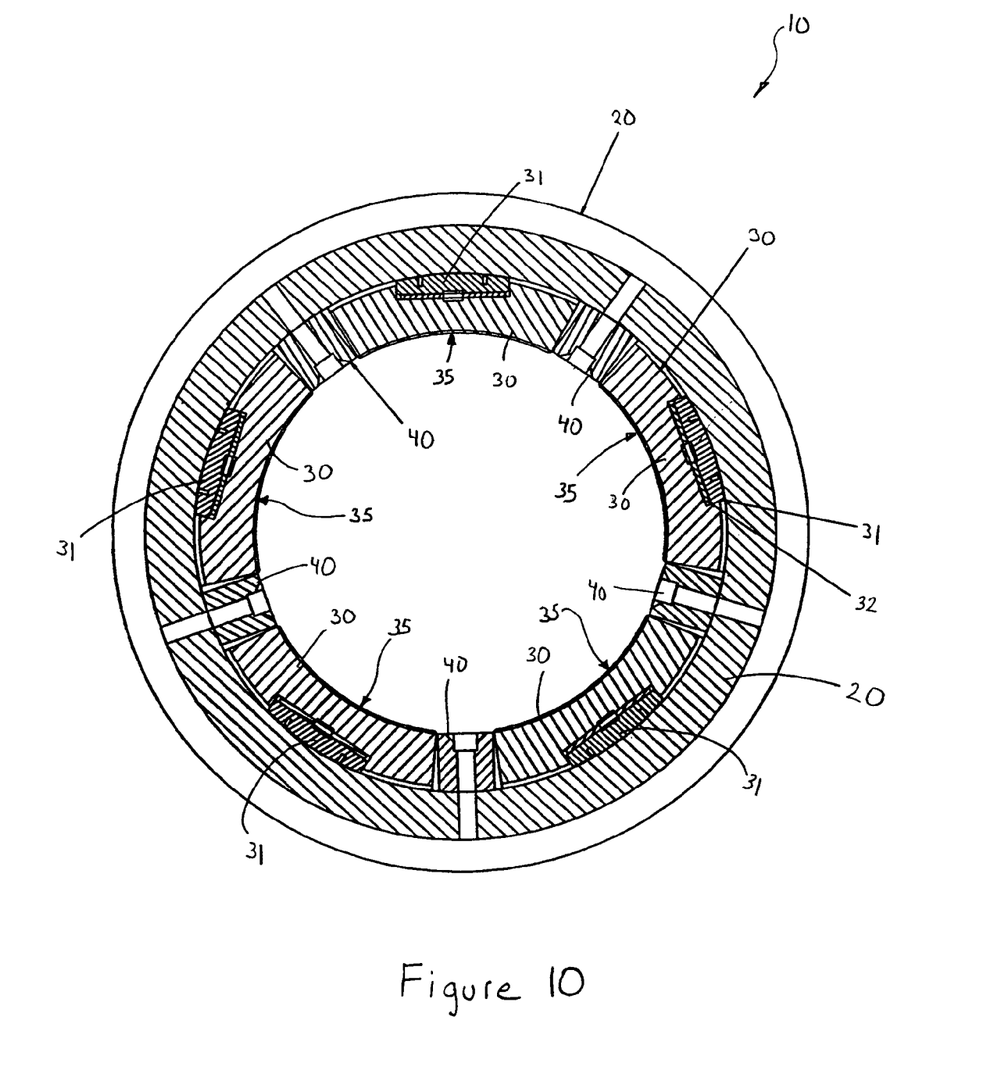
FIG. 10 is a lateral cross-sectional view of the journal bearing of FIG. 7.

Referring to FIG. 4, the journal bearing 10 is illustrated in an exploded view so that its individual components are more clearly visible. Each bearing shoe 30 comprises a shoe support 31 connected to its rear surface 32. A shim 33 is positioned between each shoe support 31 and the corresponding bearing shoe 30. Each shim 33 and shoe support 31 is secured to the rear surface 31 of the corresponding bearing shoe 30 via two shoe support screws 34. When assembled, the shim 33 fits into an indentation 38 in the rear surface 32 of the bearing shoe 30. The shoe supports 31 act as contacts between the inner surface of the aligning ring 20 and the bearing shoes 30 when the journal bearing 10 is fully assembled (FIG. 10). As a result, properly contouring the surfaces of the shoe supports 31 can result in the bearing shoe 30 being a tilt bearing shoe if desired. The shims 33 act as a means by which one can adjust the journal bearing 10 to accommodate different sized shafts, or to ensure that a tight fit results between the bearing shoes 30 and a shaft being supported.

Figure 5A:
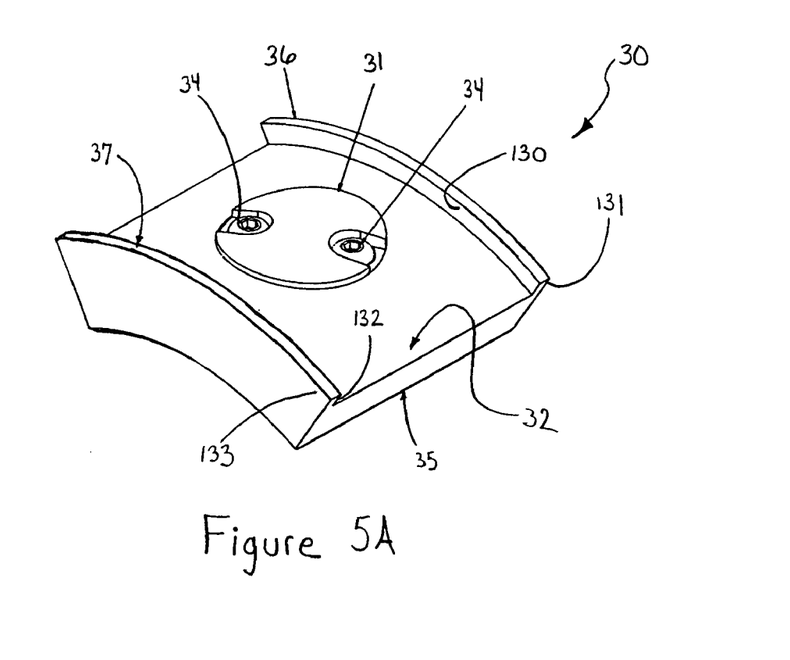
FIG. 5A is rear perspective view of a bearing shoe according to an embodiment of the present invention.
Figure 5B:
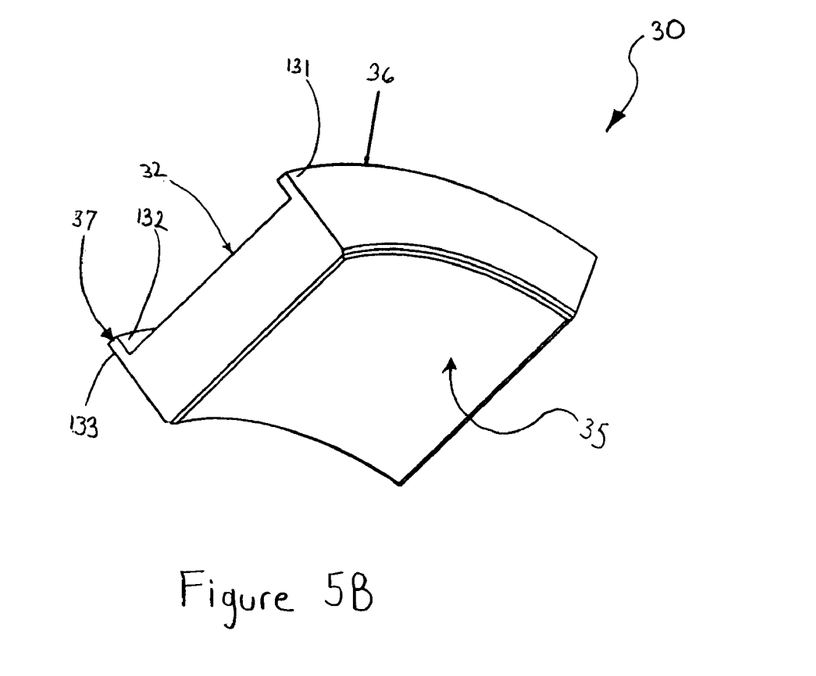
FIG. 5B is a front perspective view of the bearing shoe of FIG. 5A.

Turning now to FIGS. 5A and 5B, the design of the self-retaining bearing shoes 30 will be discussed in detail. The discussion of the bearing shoes will be had with respect to a single bearing shoe 30 with the understanding that all of the bearing shoes of the journal bearing 10 are preferably constructed in an identical manner. The bearing shoe 30 has a rear surface 32 and an arcuate working surface 35. The arcuate working surface 35 is designed to be in bearing contact with a shaft supported by the journal bearing 10. A top flange 36 and a bottom flange 37 extend from the rear surface 32 of the bearing shoe 30 in a radial direction.

While top flange 36 and bottom flange 37 extend from the rear surface 32 at the top and bottom of the bearing shoe 30 respectively, in other embodiments, the top and/or bottom flanges 36, 37 may extend from a middle portion of the bearing shoe 30. In such embodiments, the rear surface 32 of the bearing shoe 30 will continue above the top flange 36 and/or below the bottom flange 37. Moreover, while the top and bottom flanges 36, 37 are illustrated as running along the entire length of the bearing shoe 30, it is possible for the flanges 36, 37 to be segmented and/or only run a partial length of the bearing shoe 30.

The top flange 36 comprises a top surface 130 and a bottom surface 131. Similarly, the bottom flange 37 comprises a top surface 132 and a bottom surface 133. As will be discussed in greater detail below with respect to FIG. 8, when the bearing shoe 30 is properly assembled within the aligning ring 20 (as shown in FIG. 3), the top and bottom flanges 36, 37 of the bearing shoe perform a self-retaining function, prohibiting the bearing shoe 30 from separating from the aligning ring 20 in an axial direction of the shaft.

Referring again to FIG. 4, the journal bearing 10 comprises five oil feed bars 40 secured within aligning ring 20. Each oil feed bar 40 is secured to the aligning ring 20 by two feed bar screws 46. More specifically, each oil feed bar 40 is secured to the aligning ring by extending two feed bar screws 46 through a pair of vertically aligned screw holes 47. The feed bar screws 46 extend through the thickness of the aligning ring 20 and threadily engage corresponding threaded holes 48 located on the oil feed bar 40.

An oil feed hole 23 is provided in the aligning ring 20 between each set of vertically aligned screw holes 47. The oil feed hole 23 forms a passageway through aligning ring 20 so that oil, or another lubricant, can be feed to oil feed bars 40. The passageway formed by oil feed hole 23 is in fluid connection with the oil supply hole 49 of the oil feed bar 40.

Figure 6A:
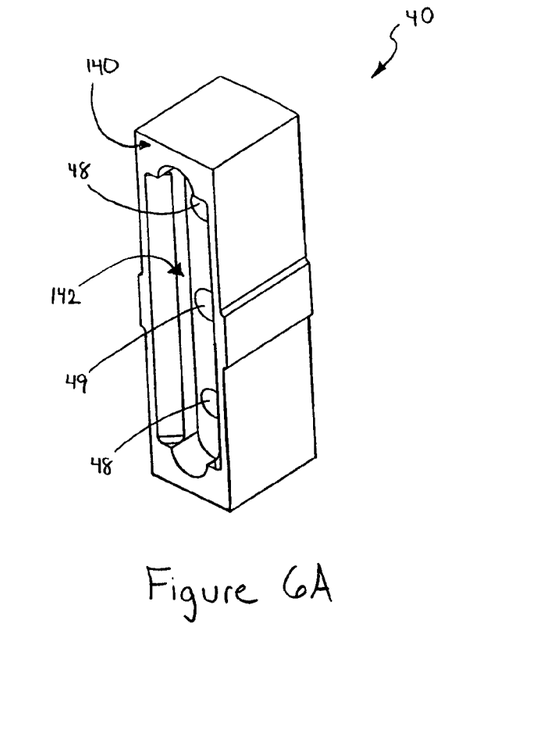
FIG. 6A is a front perspective view of an oil feed bar used in the journal bearing of FIG. 3.
Figure 6B:
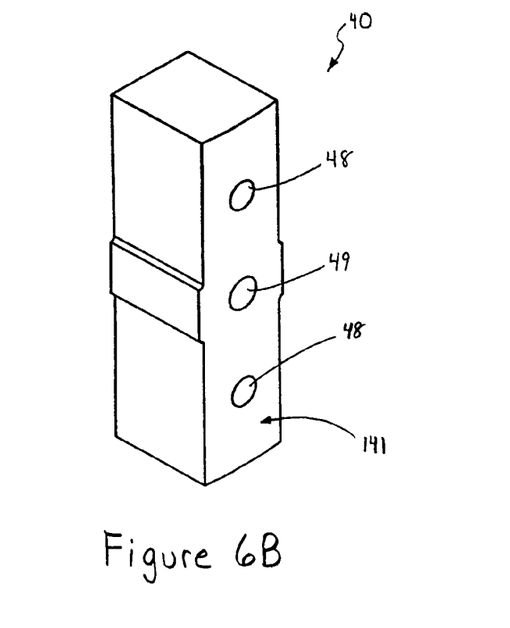
FIG. 6B is a rear perspective view of the oil feed bar of FIG. 6A.

Referring now to FIGS. 6A and 6B, the oil feed bars 40 will be described in greater detail. The discussion of the oil feed bars will be had with respect to a single oil feed bar 40 with the understanding that all of the oil feed bars of the journal bearing 10 are preferably constructed in an identical manner.

The oil feed bar 40 comprises a front surface 140 and a rear surface 141. When the oil feed bar 40 is properly secured within the aligning ring 20 (as shown in FIG. 3), the front surface 140 of the oil feed bar 40 faces the center of the journal bearing 10 while the rear surface 141 is in contact with an inner surface of the aligning ring 20. Thus, when a shaft is positioned within the journal bearing 10, and in bearing contact with the arcuate working surface 35 of the bearing shoes 30 (FIG. 5A), the front surface 140 of the oil feed bar also faces the shaft. However, because the oil feed bars 40 are designed to be slightly thinner than the bearing shoes 30, the front surface 140 of the oil feed bar 40 will not contact the shaft.

The oil feed bars 40 serve two primary purposes in the journal bearing 10 of the present invention; (1) to provided a lubricant to the working surfaces 35 of the bearing shoes 30; and (2) to prohibit circumferential movement of the bearing shoes 30 within the aligning ring 20.

Figure 9:
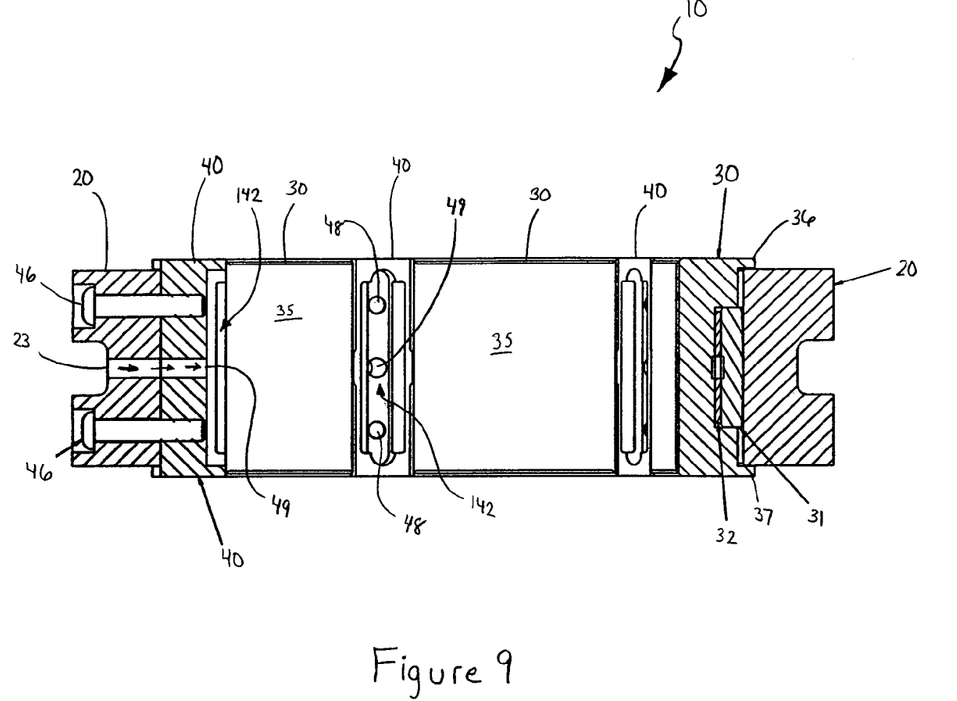
FIG. 9 is a cross-sectional view of the journal bearing of FIG. 7 along view B—B.

Referring now to FIGS. 6A, 6B, and 9, the first primary purpose of the oil feed bars 40 will be discussed. The oil feed bar 40 has a vertically oriented oil feed groove 142 in the front surface 140. The oil supply hole 49 forms a passageway from the rear surface 141 of the oil feed bar 40 to the oil feed groove 142. When the journal bearing 10 is used to support a rotating shaft, oil (or another lubricant) is fed through the aligning ring 20 via oil feed hole 23. The supplied oil passes through the aligning ring 20 and into the oil supply hole 49 on the rear surface of the oil feed bar 40. The supplied oil then passes through the oil feed bar 40 via the passageway formed by the oil supply hole 49 and pours into the oil feed groove 142. As a shaft rotates within the journal bearing 10, the oil supplied to the oil feed groove 142 contacts the rotating shaft and is transported to the working surfaces 35 of the bearing shoes 30 by the rotational momentum of the shaft. As such, the oil feed bars 40 direct the oil to the working surfaces 35 as needed.

The desired flow rate of the oil can be controlled by the installation of proper valves and/or mass flow controllers on the lubricant supply lines. Additionally, all connections and joints in the oil supply system are hermetically sound. This can be accomplished through the use of proper seals, such as O-rings and the like.

Figure 7:
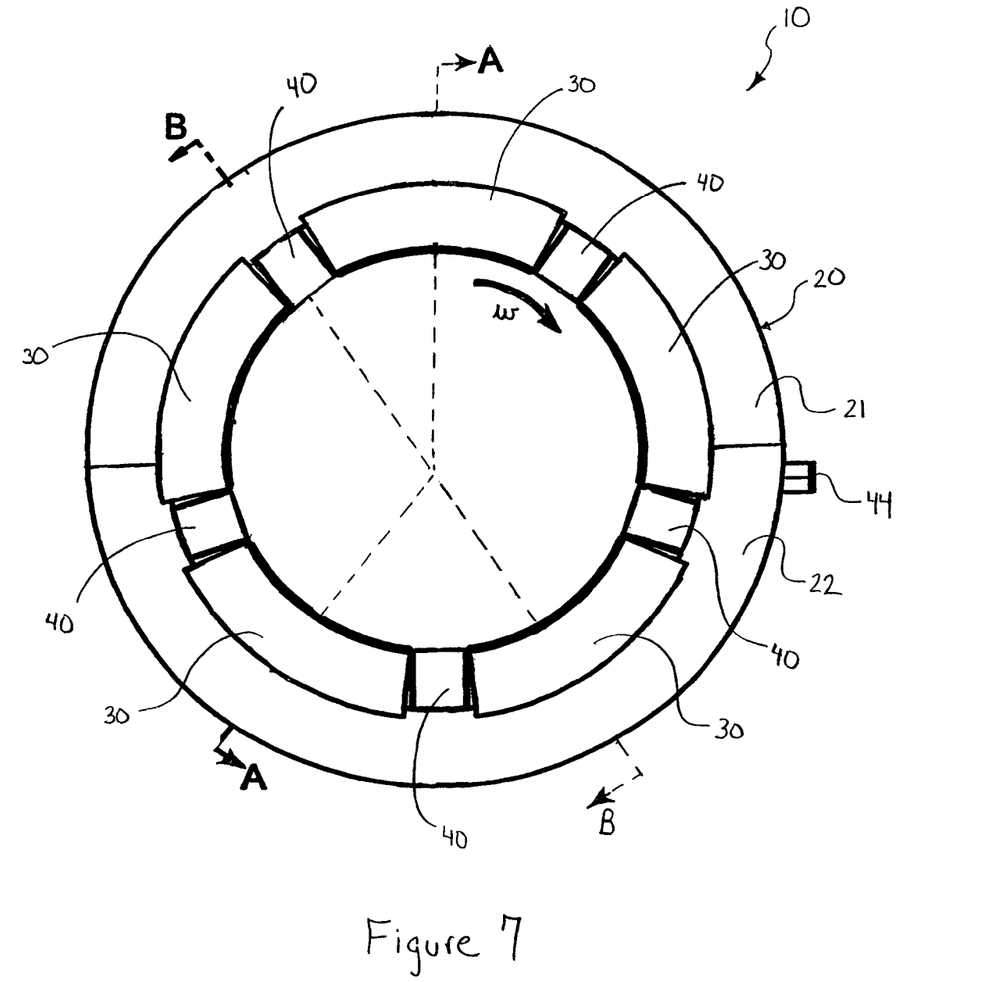
FIG. 7 is a top view of the journal bearing of FIG. 3.

Referring now to FIGS. 7 and 10, the second primary purpose of the oil feed bars 40 will be discussed in greater detail. As mentioned above, the second primary purpose of the oil feed bars 40 is to prohibit circumferential movement of the bearing shoes 30 within the aligning ring 20 when the journal bearing 10 is used to support a rotating shaft. The direction of rotation of a shaft within journal bearing 10 is indicated by the arrow ω.

As discussed above, because the bearing shoe 30 is merely in surface contact with the inner surface 26 of the aligning ring 20 via bearing shoe support 31 (FIG. 10), relative sliding in the circumferential direction is possible. However, the oil feed bars 40 are rigidly secured to the aligning ring via two screws 46 (FIG. 3). By securing an oil feed bar 40 within the aligning ring 20 between each bearing shoe 30, the oil feed bars 40 act as a stop, trapping the bearing shoes 30 therebetween, and prohibiting circumferential sliding of the bearing shoes 30 within the aligning ring 20 when a shaft is rotating ω in the journal bearing 10. Rotation of the entire journal bearing 10 is prohibited by proper engagement of the dowel 44 to a stationary body. It should be noted that the aligning ring 20 can take on any outer shape so long as its inner surface can support a rotating shaft.

Figure 8:
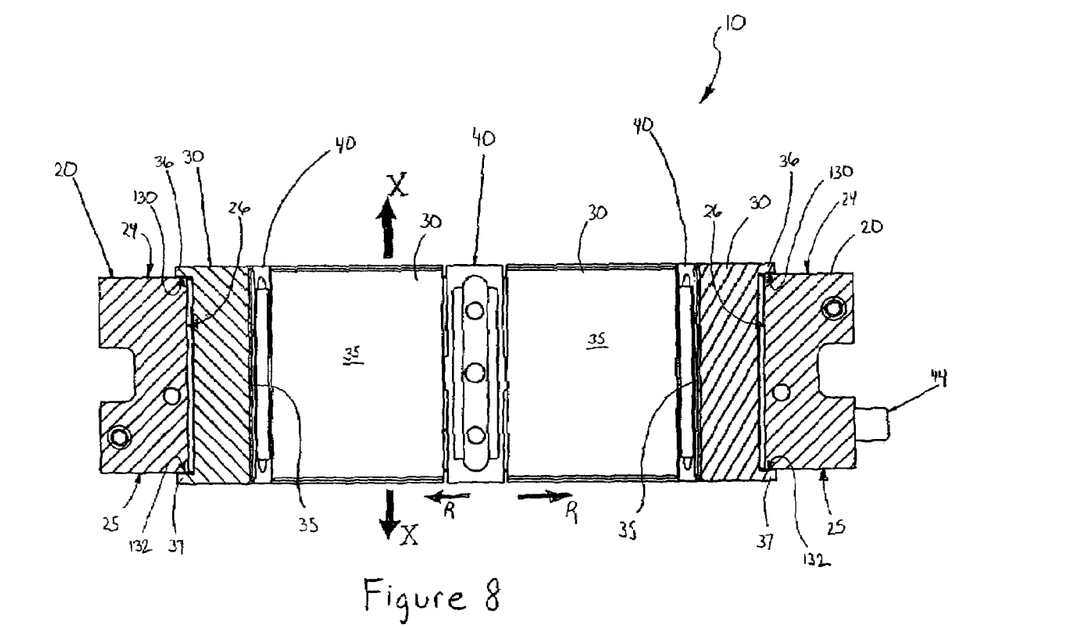
FIG. 8 is a cross-sectional view of the journal bearing of FIG. 7 along view A—A.

FIG. 8 illustrates how the top and bottom flanges 36, 37 of each bearing shoe 30 perform a self-retaining function, prohibiting relative movement between the bearing shoes 30 and the aligning ring 20 in either axial direction (indicated by arrows X). The bearing shoes 30 are positioned within aligning ring 20 so that the top flange 36 extends above the top surface 24 of the aligning ring 20 while the bottom flange 37 extends below the bottom surface 25 of the aligning ring 20. As a result, contact surface between the flanges 36, 37 and the aligning ring 20 prohibit movement of the bearing shoes 30 in either axial direction X with respect to the aligning ring 20. Specifically, in this embodiment, the bottom surface 130 of the top flange 36 is in contact with the top surface 24 of the aligning ring 20 while the top surface 132 of the bottom flange 37 is in contact with the bottom surface 25 of the aligning ring 20.

It is preferred that the top and bottom flanges 36, 37 engage the aligning ring 20 for a distance of at least ⅛ of an inch (in the radial direction, indicated by arrows R). However, the exact distance of engagement will be dictated by design specifications and loading requirements. In some embodiments, a small clearance may exist between the flange(s) of the bearing shoes and the surfaces of the aligning ring.

Referring to FIG. 10, the inner surface 26 of the aligning ring 20 is a substantially smooth surface. The shoe supports 31 of the bearing shoes 30 merely contact the smooth inner surface 26 of the aligning ring 20.

A method by which the journal bearing 10 can be installed to support a rotating shaft will now be discussed with reference to FIG. 3. First, the aligning ring 20 is separated into first piece 21 and second piece 22. The second piece 22 has three bearing shoes 30 supported therein while the first piece has two bearing shoes 30 supported therein. Note that when separated, the end bearing shoes 30 will circumferentially extend beyond the second piece 22 in both directions. During installation, the second piece 22 is positioned against one side of a shaft so that the working surfaces 35 of the three bearing shoes 30 are in contact with the shaft. Once the second piece is properly positioned, the first piece 21 is positioned on the opposite side of the shaft, aligned with the second piece 22, and moved towards the second piece 22.

As the first piece 21 moves toward the second piece 22, the end bearing shoes 30 of the second piece 22 that extend circumferentially beyond the second piece 22, slidably receive and guide the first piece 21 into proper alignment. The first piece 21 continues to be moved toward the second piece until the working surfaces 35 of the bearing shoes 30 on the first piece 21 also come into contact with the shaft. At this point, the two joint screws 43 are threadily inserted through the second piece 22 and into the first piece 21 on both sides, securing the first piece 21 to the second piece 22 to form the aligning ring 20.

Any and/or all of the details of the journal bearing and the lubricating process discussed above can be incorporated into the method if desired.

Figure 11:
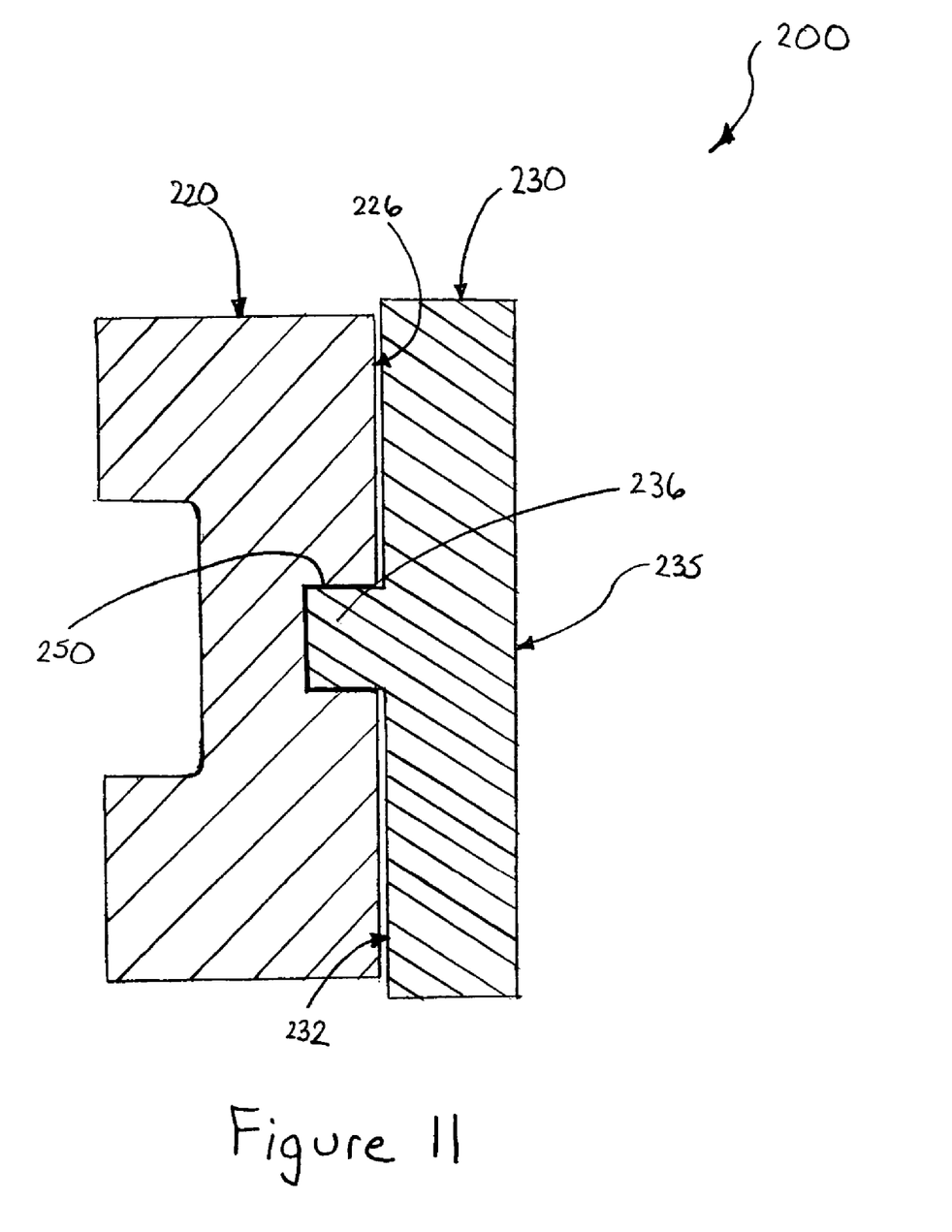
FIG. 11 is a schematic cross-sectional view of a portion of a journal bearing according to a second embodiment of the resent invention.

Turning now to FIG. 11, a portion of a journal bearing assembly 200 designed to incorporate self-retaining bearing shoes 230 according to a first alternative embodiment to the present invention is schematically illustrated. Only the details of the journal bearing assembly 200 that differ from the journal bearing 10 above are illustrated and described below. Discussion of the remaining structural and functional details of journal bearing assembly 200 will be omitted with the understanding that any and/or all of the details/designs discussed above with respect to the journal bearing 10, its components, and its installation, are applicable to, and can be incorporated into, the journal bearing assembly 200.

The journal bearing assembly 200 comprises an aligning ring 220 and a bearing shoe 230. The bearing shoe 230 comprises a single flange 236 extending form its rear surface 232 of the at or near the middle. The bearing shoe 230 also comprises an arcuate working surface 235. The inner surface 226 of the aligning ring 220 comprises a groove 250 for receiving the flange 236 of the bearing shoe 230. When the journal bearing assembly 200 is assembled for use to support a rotating shaft, the flange 236 of the bearing shoe 230 extends into the groove 250 to form a flange/groove assembly. Thus, the flange/groove assembly prohibits the bearing shoe 230 from separating from the aligning ring in either axial direction.

Figure 12:
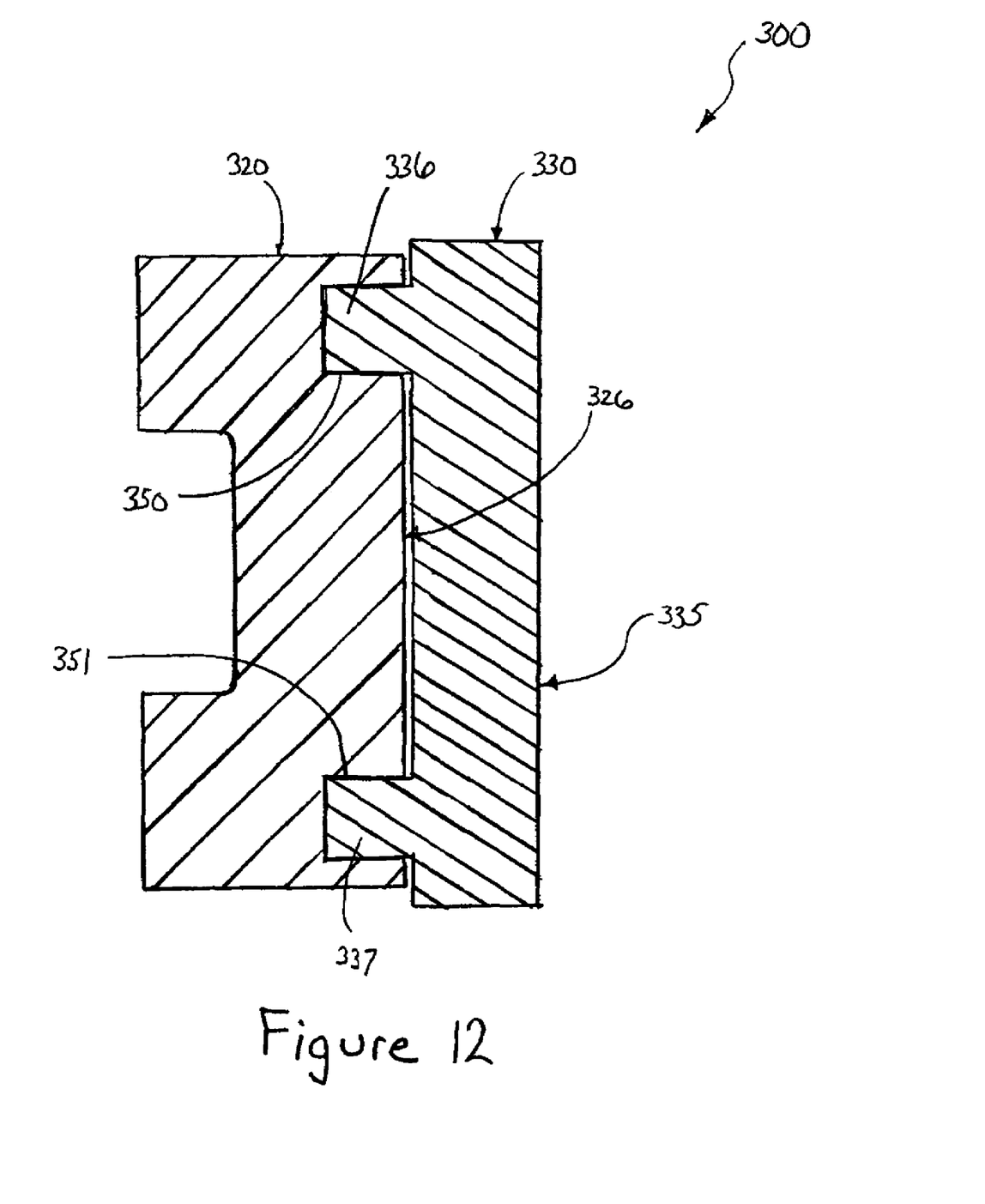
FIG. 12 is a schematic cross-sectional view of a portion of a journal bearing according to a third embodiment of the resent invention.

Referring now to FIG. 12, a portion of a journal bearing assembly 300 designed to incorporate self-retaining bearing shoes 330 according to a second alternative embodiment to the present invention is schematically illustrated. The journal bearing 300 functions identical to the journal bearing 200 except that the bearing shoe 330 comprises two flanges 336, 337 that fit into corresponding grooves 350, 351 on an inner surface 326 of the aligning ring 320. The bearing shoe 330 also comprises an arcuate working surface 335.

While the invention has been described and illustrated in sufficient detail that those skilled in this art can readily make and use it, various alternatives, modifications, and improvements should become readily apparent without departing from the spirit and scope of the invention.

What is claimed is:

1. A journal bearing for supporting a rotating shaft having an axis, the journal bearing comprising:
   an aligning ring;
   at least one shoe having a rear surface and an arcuate working surface for bearing contact with the rotating shaft, the at least one shoe having a flange extending from the rear surface; and
   the at least one shoe positioned in the aligning ring so that surface contact between the flange and the aligning ring prohibits the at least one shoe from separating from the aligning ring in an axial direction.

2. The journal bearing of claim 1 further comprising:
   first and second flanges extending from the rear surface of the at least one shoe;
   the first flange located on a top portion of the at least one shoe and the second flange located on a bottom portion of the at least one shoe; and
   the at least one shoe positioned in the aligning ring so that the first flange extends above a top surface of the aligning ring and the second flange extends below a bottom surface of the aligning ring.

3. The journal bearing of claim 2 wherein a bottom surface of the first flange is in surface contact with the top surface of the aligning ring and a top surface of the second flange is in surface contact with the bottom surface of the aligning ring.

4. The journal bearing of claim 2 wherein the aligning ring has a substantially smooth inner surface.

5. The journal bearing of claim 2 wherein the first flange extends from the rear surface at a top of the at least one shoe and the second flange extends from the rear surface at a bottom of the at least one shoe.

6. The journal bearing of claim 1 free of retaining plates.

7. The journal bearing of claim 1 wherein an inner surface of the aligning ring comprises a groove, the at least one shoe positioned in the aligning ring so that the flange extends into the groove.

8. The journal bearing of claim 1 comprising a plurality of shoes, each shoe having a rear surface and an arcuate working surface for bearing contact with the rotating shaft, each shoe having a flange extending from the rear surface, each shoe positioned in the aligning ring so that surface contact between the flange and the aligning ring prohibits each shoe from separating from the aligning ring in an axial direction.

9. The journal bearing of claim 8 further comprising an oil feed bar secured in the aligning ring between each shoe.

10. The journal bearing of claim 9 wherein the oil feed bars are secured to the aligning ring so as to prohibit relative movement between each shoe and the aligning ring in a circumferential direction.

11. The journal bearing of claim 8 wherein the number of shoes is five.

12. The journal bearing of claim 1 wherein the aligning ring is a two-piece assembly.

13. The journal bearing of claim 1 further comprising a shoe support on the rear surface of the at least one shoe, the shoe support in surface contact with an inner surface of the aligning ring.

14. The journal bearing of claim 13 further comprising a shim retained between the shoe support and the shoe.

15. The journal bearing of claim 1 wherein the flange extends at least ⅛ inch from the rear surface of the at least one shoe.

16. The journal bearing of claim 1 comprising:
   a plurality of shoes, each shoe having a rear surface and an arcuate working surface for bearing contact with the rotating shaft, each shoe having first and second flanges extending from the rear surface, the first flange located on a top portion of each shoe and the second flange located on a bottom portion of each shoe, and each shoe positioned in the aligning ring so that the first flange extends above a top surface of the aligning ring and the second flange extends below a bottom surface of the aligning ring;
   an oil feed bar secured in the aligning ring between each of the shoes, the oil feed bars secured to the aligning ring so as to prohibit relative movement between the shoes and the aligning ring in a circumferential direction;

a shoe support on the rear surface of each shoe, each shoe support in surface contact with an inner surface of the aligning ring;

a shim retained between each shoe support and each shoe;

wherein the first flange extends from the rear surface at a top of each shoe and the second flange extends from the rear surface at a bottom each shoe;

wherein the aligning ring is a two-piece assembly;

wherein the first and second flanges extend at least ⅛ inch from the rear surface of each shoe;

wherein a bottom surface of each first flange is in surface contact with the top surface of the aligning ring;

wherein a top surface of each second flange is in surface contact with the bottom surface of the aligning ring;

wherein the working surface of each shoe is arcuate;

wherein the aligning ring has a substantially smooth inner surface; and wherein the journal bearing is free of retaining plates.

17. A method of supporting a rotating shaft having an axis comprising:

providing a journal bearing comprising an aligning ring, at least one shoe having a rear surface and an arcuate working surface for bearing contact with the rotating shaft, the at least one shoe having a flange extending from the rear surface, and the at least one shoe positioned in the aligning ring so that surface contact between the flange and the aligning ring prohibits the at least one shoe from separating from the aligning ring in an axial direction;

fitting the journal bearing around a section of the shaft so that an outside surface of the shaft is in bearing contact with the arcuate working surface of the at least one shoe; and rotating the shaft.

18. The method of claim 17 wherein the aligning ring is a two-piece assembly, the fitting step comprising:

positioning a first piece of the aligning ring having one or more of the shoes retained therein on one side of the shaft;

positioning a second piece of the aligning ring having one or more of the shoes retained therein on an opposite side of the shaft; and moving the first piece of the aligning ring toward the second piece of the aligning ring until the shaft is in bearing contact with the shoes of the first and second pieces of the aligning ring, wherein at least one of the shoes slidably receives and guides either the first or second piece of the aligning ring during said moving; and connecting the first and second pieces of the aligning ring.

19. The method of claim 18 wherein the journal bearing further comprises an oil feed bar secured in the aligning ring between each of the shoes, wherein the oil feed bars are secured to the aligning ring so as to prohibit relative movement between the shoes and the aligning ring in a circumferential direction.

* * * * *